US011053983B2

(12) United States Patent
Meyer et al.

(10) Patent No.: US 11,053,983 B2
(45) Date of Patent: Jul. 6, 2021

(54) TORQUE TUBE ASSEMBLIES FOR USE WITH AIRCRAFT HIGH LIFT DEVICES

(71) Applicant: The Boeing Company, Chicago, IL (US)

(72) Inventors: Mark R. Meyer, Edmonds, WA (US); Tyler S. Gregson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 606 days.

(21) Appl. No.: 15/875,820

(22) Filed: Jan. 19, 2018

(65) Prior Publication Data

US 2019/0226529 A1 Jul. 25, 2019

(51) Int. Cl.
*F16D 3/06* (2006.01)
*B64C 13/28* (2006.01)
(Continued)

(52) U.S. Cl.
CPC .............. *F16D 3/06* (2013.01); *B64C 13/28* (2013.01); *F16D 1/108* (2013.01); *F16D 3/387* (2013.01);
(Continued)

(58) Field of Classification Search
CPC . F16D 3/06; F16D 1/108; F16D 3/387; F16D 1/0847; F16D 2300/06;
(Continued)

(56) References Cited

U.S. PATENT DOCUMENTS 1,790,677 A    2/1931  Place
1,999,841 A *  4/1935  MacGregor .......... A01B 61/025
(Continued)

FOREIGN PATENT DOCUMENTS

CN    107131221     9/2017
DE    102008019372  10/2009
(Continued)

OTHER PUBLICATIONS

Universal Joint and Driveshaft Design Manual, AE-7, Society of Automotive Engineers, Inc., Warrendale, PA, pp. 185-198, TJ1079. S62. (Year: 1979).*
(Continued)

*Primary Examiner* — Greg Binda
(74) *Attorney, Agent, or Firm* — Hanley, Flight & Zimmerman, LLC

(57) ABSTRACT

Example torque tube assemblies may be used with aircraft high lift devices. An example torque tube assembly includes a torque tube having a first end and a second end opposite the first end. A first fitting is coupled to the first end and a second fitting is coupled to the second end. The first fitting is to be coupled to a first high lift device of an aircraft. The second fitting has a spline section. The torque tube assembly also includes a sliding spline shaft having a channel and a first yoke. The second fitting is slidably received within the channel. The torque tube assembly further includes a spline coupling having a second yoke, which is coupled to the first yoke of the sliding spline shaft to form a U-joint. The spline coupling is to be coupled to a second high lift device of the aircraft.

19 Claims, 10 Drawing Sheets

(51) Int. Cl.
*F16D 1/108* (2006.01)
*F16D 3/38* (2006.01)
*B64C 9/22* (2006.01)
*B64C 9/16* (2006.01)
*B64C 13/34* (2006.01)
*F16D 3/84* (2006.01)
*F16D 3/41* (2006.01)
*F16C 3/03* (2006.01)
*F16D 1/08* (2006.01)
*B64C 9/00* (2006.01)
*F16D 1/10* (2006.01)

(52) U.S. Cl.
CPC ............... *B64C 9/00* (2013.01); *B64C 9/16* (2013.01); *B64C 9/22* (2013.01); *B64C 13/34* (2013.01); *F16C 3/03* (2013.01); *F16C 2326/43* (2013.01); *F16D 1/0847* (2013.01); *F16D 3/41* (2013.01); *F16D 3/848* (2013.01); *F16D 2001/103* (2013.01); *F16D 2300/06* (2013.01); *Y10T 403/7033* (2015.01)

(58) Field of Classification Search
CPC ...... F16D 3/848; F16D 3/41; F16D 2001/103; B64C 13/28; B64C 9/22; B64C 9/16; B64C 13/34; B64C 9/00; B64C 9/20; B64C 9/26; Y10T 403/7033; F16C 3/03; F16C 2326/43
USPC ............ 244/99.3, 213–215; 464/16, 162
See application file for complete search history.

(56) References Cited

U.S. PATENT DOCUMENTS

| | | | |
|---|---|---|---|
| 3,293,884 A | | 12/1966 | Grob |
| 3,577,746 A | | 5/1971 | Dolan |
| 3,642,311 A | | 2/1972 | Edgemond, Jr. |
| 3,935,754 A | | 2/1976 | Comollo |
| 3,986,689 A | * | 10/1976 | Maltby ............ B64C 13/24 244/213 |
| 4,180,222 A | | 12/1979 | Thornburg |
| 4,441,675 A | | 4/1984 | Boehringer et al. |
| 4,561,799 A | | 12/1985 | Arena |
| 4,695,014 A | | 9/1987 | Mourani |
| 4,834,326 A | | 5/1989 | Stache |
| 4,930,204 A | | 6/1990 | Schurter |
| 5,686,907 A | | 11/1997 | Bedell et al. |
| 5,983,478 A | | 11/1999 | Dolan et al. |
| 6,164,698 A | | 12/2000 | Gotoh |
| 6,475,093 B1 | | 11/2002 | Keyes et al. |
| 9,316,264 B2 | | 4/2016 | Choi |
| 9,739,316 B2 | | 8/2017 | Schwartz et al. |
| 10,240,641 B2 | | 3/2019 | Akita et al. |
| 2004/0226170 A1 | | 11/2004 | Prucher |
| 2006/0144903 A1 | | 7/2006 | Perry et al. |
| 2008/0125231 A1 | | 5/2008 | Fujita et al. |
| 2010/0120545 A1 | | 5/2010 | Huis |
| 2010/0130291 A1 | | 5/2010 | Ando et al. |
| 2011/0030496 A1 | | 2/2011 | Tokioka |
| 2012/0080258 A1 | | 4/2012 | Tokioka |
| 2012/0108349 A1 | | 5/2012 | Foley et al. |
| 2014/0113734 A1 | | 4/2014 | Lee et al. |
| 2014/0187339 A1 | | 7/2014 | Kurokawa |
| 2015/0075897 A1 | | 3/2015 | Copeland |
| 2015/0083852 A1 | | 3/2015 | Moser et al. |
| 2015/0119154 A1 | | 4/2015 | Choi |
| 2018/0003240 A1 | | 1/2018 | Sugiyama et al. |
| 2018/0003243 A1 | | 1/2018 | Schwartz et al. |

FOREIGN PATENT DOCUMENTS

| | | |
|---|---|---|
| DE | 102014118398 | 6/2016 |
| EP | 2829759 | 1/2015 |
| EP | 3128196 | 2/2017 |
| EP | 3222868 | 9/2017 |
| JP | H0514624 U | 2/1993 |
| JP | 11217026 | 8/1999 |

OTHER PUBLICATIONS

European Patent Office, "Extended European Search Report," issued in connection with European Patent No. 18213696.0, dated Apr. 9, 2019, 9 pages.

European Patent Office, "Extended European Search Report", issued in connection with application No. 18212532.8 dated Apr. 9, 2019, 10 pages.

Chrysler, "800ae12b," retrieved from [https://w05.dealerconnect.chrysler.com/service.mds2002/serviceinfo.en_US800ae12b.gif] on Aug. 4, 2015, 1 page.

Fraunhofer Institute for Machine Tools and Forming Technology IWU, "Elctromagnetic Forming," retrieved from [http://www.iwu.faunhofer.de/content/dam/iwu/en.documents/Brochures/IWU-KB-Electromagnetic-Forming.pdf], 2013, 8 pages.

summitracing.com, "Fastshafts Yokes AE128," retrieved from [http://www.summitracing.com/parts/ace-ae128] on Aug. 4, 2015, 3 pages.

United States Patent and Trademark Office, "Non-Final Office Action," issued in connection with U.S. Appl. No. 15/941,859, dated Jan. 8, 2021, 9 pages.

European Patent Office, "Communication pursuant to Article 94(3) EPC," issued in connection with European Application No. 18212532.8, dated Jan. 11, 2021, 5 pages.

* cited by examiner

TORQUE TUBE ASSEMBLIES FOR USE WITH AIRCRAFT HIGH LIFT DEVICES

FIELD OF THE DISCLOSURE

This disclosure relates generally to torque tube assemblies and, more particularly, to torque tube assemblies with U-joints for use with aircraft high lift devices.

BACKGROUND

Aircraft employ high lift devices, sometimes referred to as auxiliary airfoils, along the leading and trailing edges of the wings. For example, high lift devices along the leading edge of a wing are referred to as slats and high lift devices along the trailing edge of a wing are referred to as flaps. The high lift devices are actuated to extend outward from the wing to change the aerodynamic lift of the wing during takeoff and landing. Each of the high lift devices is actuated by one or more drive mechanisms, which are coupled to ribs or support beams in the wing. In particular, each drive mechanism includes a pinion gear that is rotated to drive a rack coupled to the high lift device. As the pinion gear is rotated, the rack is driven to move the high lift device along a track, thereby extending the high lift device outward from the wing. Each pinion gear is in driving engagement with a geared rotary actuator (GRA). Each pinion gear and its respective GRA is interconnected with an adjacent (e.g., upstream and downstream) pinion gear and GRA via a torque tube. In other words, an aircraft typically employs a series of torque tubes that translate torque to each of the driving mechanisms along the leading or trailing edge of the wing. One motor may be used to drive one of the driving mechanisms, which thereby transfers torque to each of the other driving mechanisms through the series of torque tubes. Therefore, each of the high lift devices may be controlled to move, simultaneously with the other high lift devices, between a stowed configuration and an extended configuration.

Known torque tube assemblies utilize bolted flanges or plates to couple a torque tube to a pinion gear or GRA. However, using flanges results in a relatively large rotational envelope, which requires a relatively large space to accommodate the rotating flanges. Further, in some instances, the bolts of the flange can loosen, thereby reducing the structural integrity of the torque tube. Also, as the wing flexes (e.g., due to change in weight of the wing from decreasing fuel), the alignment and distances between the driving mechanisms may change. This flexing of the wing causes additional forces and strain on the torque tube assemblies.

SUMMARY

An example torque tube assembly disclosed herein includes a torque tube having a first end and a second end opposite the first end. A first fitting is coupled to the first end and a second fitting is coupled to the second end. The first fitting is to be coupled to a first high lift device of an aircraft. The second fitting has a spline section. The example torque tube assembly also includes a sliding spline shaft having a channel. The second fitting is slidably received within the channel. The sliding spline shaft has a first yoke. The example torque tube assembly further includes a spline coupling having a second yoke. The second yoke of the spline coupling is coupled to the first yoke of the sliding spline shaft to form a U-joint. The spline coupling is to be coupled to a second high lift device of the aircraft.

An example method disclosed herein includes coupling a first fitting to a first end of a torque tube and a second fitting to a second end of the torque tube. The first fitting has a first yoke, and the second fitting has a radially extending spline section. The example method also includes coupling the first yoke to a second yoke of a first spline coupling to form a first U-joint, and inserting the splined section of the second fitting into a channel of a sliding spline shaft. The sliding spline shaft has a third yoke. The example method further includes coupling the third yoke to a fourth yoke of a second spline coupling to form a second U-joint, coupling the first spline coupling to a first drive shaft associated with first high lift device on an aircraft wing, and coupling the second spline coupling to a second drive shaft associated with a second high lift device on the aircraft wing.

An aircraft disclosed herein includes a first geared rotary actuator (GRA) coupled to a wing of the aircraft and a second geared rotary actuator (GRA) coupled to the wing. The first GRA has a first drive shaft and the second GRA has a second drive shaft. The example aircraft further includes a torque tube assembly coupled between the first drive shaft and the second drive shaft. The torque tube assembly has a first portion fixedly coupled to the first drive shaft and a second portion fixedly coupled to the second drive shaft, the first portion axially slidably coupled to the second portion.

Figure 1:
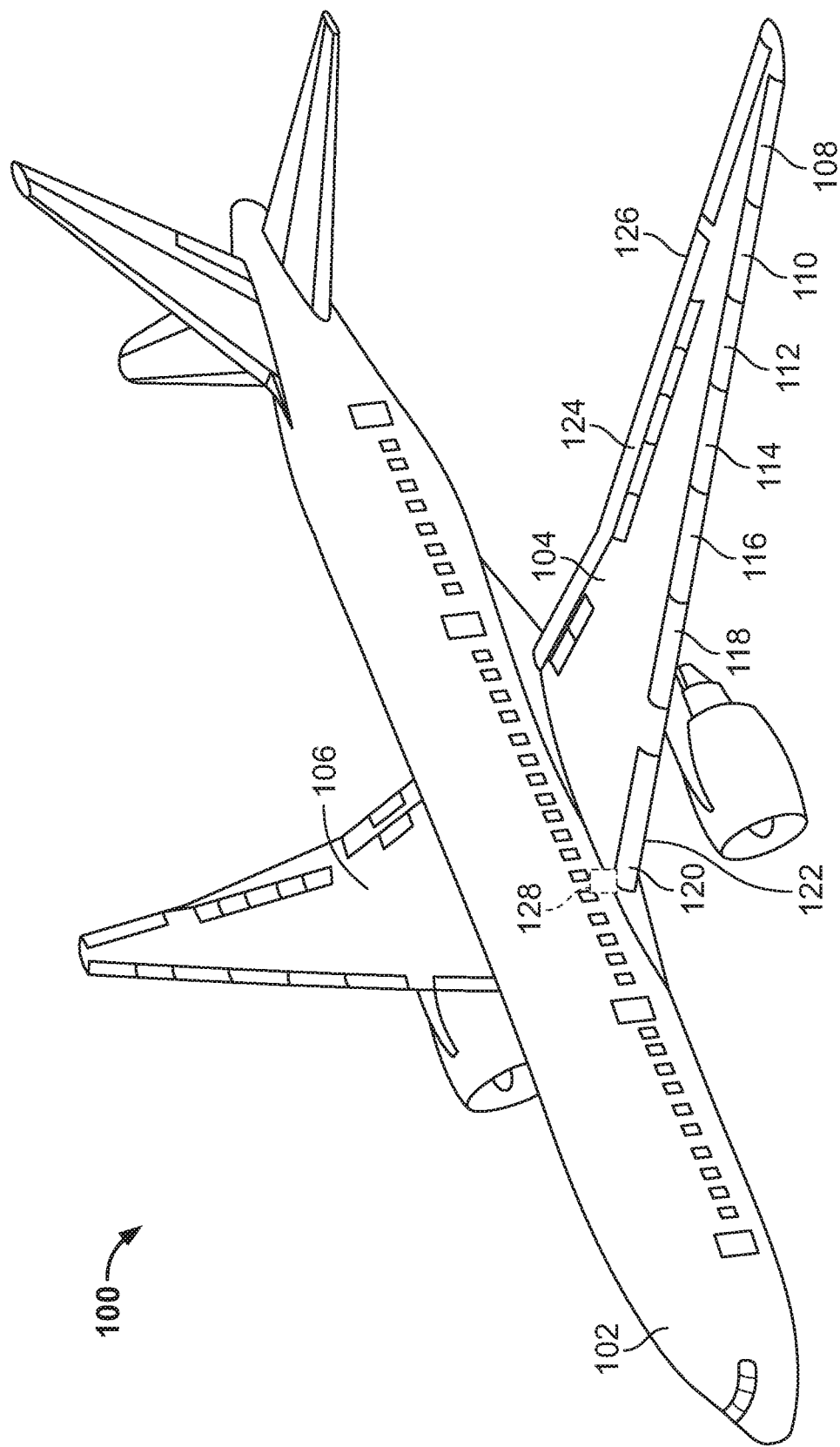
FIG. 1 illustrates an example aircraft in which example torque tube assemblies and related methods disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example torque tube assemblies and related methods that may be employed to mechanically transmit torque from a driver, such as an output shaft of a motor or actuator of a high lift device, to a driven device, such as an input shaft of a subsequent (e.g., downstream, outboard) actuator of a high lift device. An example torque tube assembly disclosed herein includes a first universal joint (U-joint) formed between a first torque tube fitting on one end of the torque tube and a first spline coupling. The first spline coupling includes an integral yoke that couples with a yoke on the first torque tube fitting to form the first U-joint. The yoke of the first torque tube fitting is integral with the first torque tube fitting and, thus, fixedly attached to the end of the torque tube. The spline coupling includes an opening with splines (e.g., ribs) to receive a spline gear or shaft of a driving member (e.g., a first drive shaft). The driving member may be a pinion shaft and/or an output shaft of a geared rotary actuator (GRA), for example.

The example torque tube assembly also includes a second torque tube fitting on the opposite end of the torque tube than the first torque tube fitting. The second torque tube fitting is slidably inserted into a channel in a sliding spline shaft. In particular, the second torque tube fitting includes splines that mesh with splines on the inside of the channel, which enables the second torque tube fitting and the sliding spline shaft to slide axially relative to each other but not rotate relative to each other. The sliding splined shaft includes a yoke that forms a second U-joint with a yoke on a second spline coupling. Similar to the first spline coupling, the second spline coupling includes an opening with splines (e.g., ribs) to receive another spline gear or shaft of a driving member (e.g., a second drive shaft). Therefore, one end of the torque tube assembly includes the first spline coupling, which may be coupled to a first drive shaft of a first GRA (e.g., an upstream driving member), and the other end of the torque tube assembly includes the second spline coupling, which may be coupled to a second drive shaft of a second GRA (e.g., a downstream driven member). As the spline gear of the first GRA rotates, the rotational power is transferred from the upstream drive shaft of the first GRA to the downstream driven shaft of the second GRA.

In some examples, the first spline coupling and the second spline coupling are fixedly coupled (e.g., via threaded fasteners) to the first and second drive shafts, respectively, while the second torque tube fitting is slidably disposed within the sliding spline shaft. Therefore, one portion of the torque tube assembly (including the torque tube, the first torque tube fitting, and the first spline coupling) is fixedly coupled to the aircraft and a second portion of the torque tube assembly (including the sliding spline shaft and the second spline coupling) is fixedly coupled to the aircraft, and the two portions are axially slidably coupled to each other. As such, the two portions of the torque tube assembly can translate axially relative to each other while still transferring rotational motion between the two drive shafts. Thus, as the wing flexes, the portions of the torque tube assembly can be displaced axially (relative to each other) to reduce strain and force on the torque tube assembly. Also, as the wing flexes, the U-joints enable the torque tube assembly to move angularly with respect to the driving member (e.g., the first drive shaft and/or the spline gear) or the driven member (e.g., the downstream drive shaft of the second GRA) while still transferring rotational motion between the two members. Furthermore, the ability to lengthen and shorten the torque tube assembly is beneficial during installation, for example, when connecting the two ends of the torque to be assembly to the first and second drive shafts (which, in some instances, have relatively tight tolerances).

In some examples, the second torque tube fitting includes two spline sections that are spaced apart from each other and that engage the splines on the inside of the channel of the sliding spline shaft. In some examples, one or more retaining bolts are screwed into the side of the sliding spline shaft and extend into the channel between the first and second spline sections to prevent the second torque tube fitting and the sliding spline shaft from becoming completely disconnected (e.g., in the event of a failure of one of the parts). For example, if one portion of the torque tube assembly becomes disconnected from the aircraft, the retaining bolts prevent the second torque tube fitting from disconnecting from the sliding spline shaft and, thus, ensures the failed portion remains connected to the aircraft via the other portion of the torque tube assembly. As such, the example retaining bolts prevent the part(s) of the torque tube assembly from potentially departing from the aircraft and/or potentially causing damage to the aircraft.

In some examples, the torque tube assembly includes a grease retainer that covers the opening where the second torque tube fitting is inserted into the channel of the sliding spline shaft. The grease retainer prevents moisture and/or other unwanted material from accumulating in the channel, which may otherwise cause corrosion in the channel and potential seizure of the parts. Further, in some examples, grease is injected into the channel to provide lubrication between the splines of second torque tube fitting and the splines of sliding spline shaft. The grease retainer prevents the grease from escaping from the channel.

Example torque tube assemblies disclosed herein employ spline connections instead of bolted plate/flange connections as seen in known torque tube assemblies. Spline connections provide excellent torque transfer. Further, if the bolts of a known plate/flange connection fails, for example, the plates/flanges fall apart and, thus, cannot transfer rotational energy therebetween. In example torque tube assemblies disclosed herein, however, if the bolts fail, the spline connections remain intact and, thus, the torque tube assembly can continue to transfer rotational energy (via the interaction between the splines on each component). Additionally, in some examples, the example torque tube assemblies do not employ flanges (e.g., because they implement smaller envelope fittings such as EMF formed fittings) and, thus, the rotational envelope is relatively smaller than known torque tube assemblies. Also, in such examples, the risk of loosening flange bolts is eliminated. Further, example torque tube assemblies described herein are less susceptible to dynamic imbalance, which may be caused by a missing bolt, for example. Example torque tube assemblies described herein also utilize fewer fasteners than known torque tube assemblies.

FIG. 1 illustrates an example aircraft 100 in which examples disclosed herein may be implemented. In the illustrated example, the aircraft 100 includes a fuselage 102, a first wing 104 coupled to the fuselage 102, and a second wing 106 coupled to the fuselage 102. The first and second wings 104, 106 of the illustrated example have control surfaces such as high lift devices (e.g., auxiliary airfoils, slats, Kreuger flaps, trailing edge slats, etc.) that are located along the leading and trailing edges of the first and second wings 104, 106, and which may be displaced or extended to change the aerodynamic lift of the aircraft 100. When extended from the first wing 104, the high lift devices increase the effective size, curvature camber, and area of the first wing 104, thereby increasing the lift of the first wing 104. For example, the first wing 104 includes a first slat 108, a second slat 110, a third slat 112, a fourth slat 114, a fifth slat 116, a sixth slat 118, and a seventh slat 120 located along a leading edge 122 and a flap 124 located along a trailing edge 126. The first wing 104 may include more or fewer slats and flaps. Additionally or alternatively, the first wing 104 may include other control surfaces such as ailerons, spoilers, tabs, trailing edge slats, Kreuger flaps, etc. The second wing 106 may include similar high lift devices but are not discussed to avoid redundancy.

In general, each of the slats 108-120 is deployed using two separate but coordinated drive mechanisms or actuators, one on the inboard side and one on the outboard side of each of the respective slats 108-120. The respective actuators of the slats 108-120 are coupled to each other and to an adjacent (e.g., an upstream or downstream) drive mechanism via example torque tube assemblies, as disclosed in further detail herein. In the illustrated example, a motor or power drive unit (PDU) 128 is employed to drive an actuator for deploying the seventh slat 120. An output of the actuator is operatively coupled via an example torque tube assembly to another actuator for deploying the seventh slat 120, which is operatively coupled via an example torque tube assembly to drive another actuator for deploying the sixth slat 118, and so forth. Therefore, the PDU 128 provides driving power to all of the actuators via the torque tube assemblies along the leading edge 122 of the first wing 104 to deploy the high lift devices. In some examples, the PDU 128 also provides driving power to all of the actuators for driving the slats on the second wing 106. As a result, all of the slats along the leading edges of the first and second wings 104, 106 may be deployed simultaneously. Although the torque tube assemblies are described in relation to the slats 108-120, it is understood that the examples disclosed herein may be similarly applied to any of the other high lift devices (e.g., the trailing edge flaps).

Figure 2:
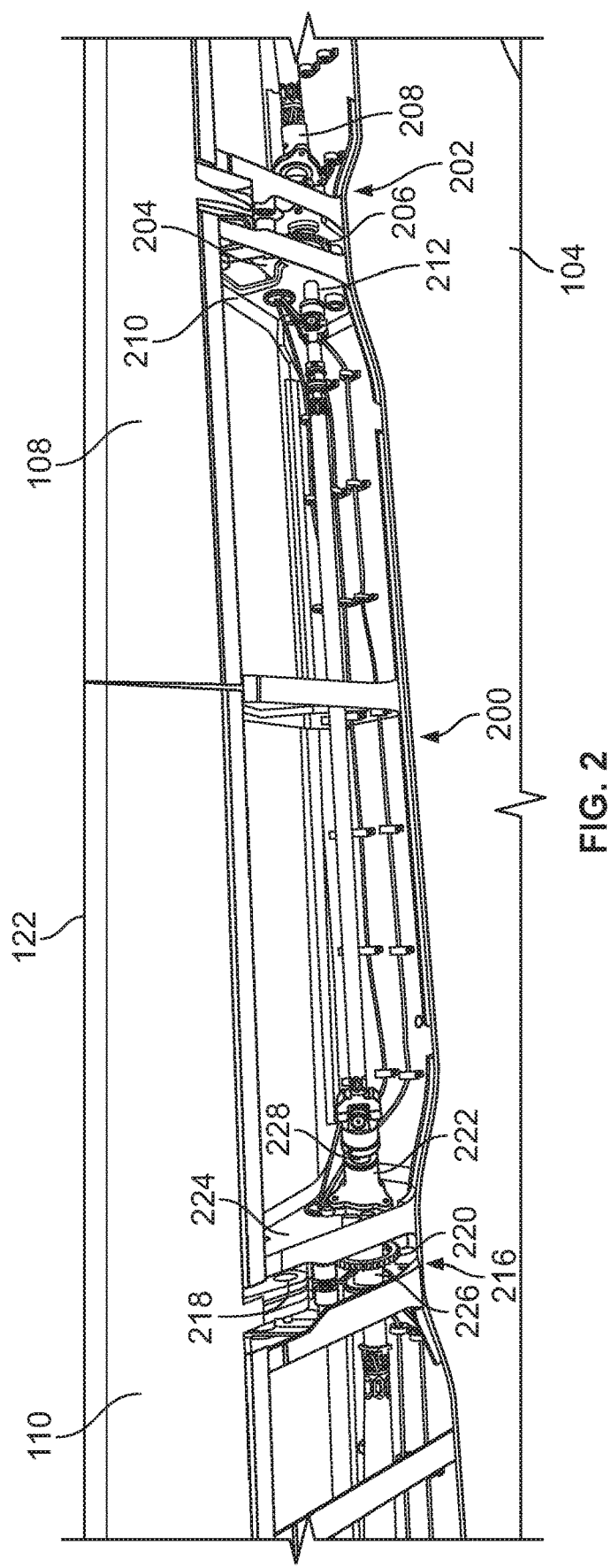
FIG. 2 is a partially sectioned view of an underside of a wing of the aircraft in FIG. 1 showing an example torque tube assembly constructed in accordance with teachings of this disclosure.

FIG. 2 shows an underside of the leading edge 122 of the first wing 104 between the first slat 108 and the second slat 110. As disclosed above, each of the slats 108-120 is actuated by two actuators (e.g., rack and pinion assemblies) that are mounted to ribs or supports in the first wing 104, and the actuators are driven by the PDU 128 (FIG. 1). An example torque tube assembly 200 is illustrated that is employed to transfer rotational energy between one of the actuators of the second slat 110 and one of actuators of the first slat 108. In particular, a first actuator 202 is provided for moving the first slat 108. The first actuator 202 includes a first rack 204 (e.g., a geared rack, a toothed rack), a first pinion gear 206 (e.g., a circular gear) that drives the first rack 204, and a first geared rotary actuator (GRA) 208 that drives the first pinion gear 206. The first pinion gear 206 is rotatably coupled (e.g., mounted) to a first rib or support 210 of the first wing 104. As the first pinion gear 206 rotates, the first rack 204 is driven outward, thereby extending the first slat 108 outward from the first wing 104. In some examples, the first pinion gear 206 drives a sector gear, which drives the first rack 204. The first pinion gear 206 is coupled to and driven by the first GRA 208. The first GRA 208 has an upstream or input shaft 212 and a downstream or output shaft (e.g., a high lift device drive shaft). The first GRA 208 contains a gear train (e.g., a system of gears, a transmission) that may be used to change the gearing ratio between an input (e.g., the input shaft 212) and the first pinion gear 206. In general, the PDU 128 (FIG. 1) rotates at a relatively fast speed (e.g., about 700 revolutions per minute (RPM)). The first GRA 208 reduces the rotational speed provided to the first pinion gear 206 and, thus, increases the torque provided to the first pinion gear 206. Similar to the first slat 108, the second slat 110 includes a second actuator 216 having a second rack 218 and a second pinion gear 220 driven by a second GRA 222 and operatively coupled to a second rib or support 224. The second GRA 222 has an upstream or input shaft 226 and a downstream or output shaft 228 (e.g., a high lift device drive shaft). To transfer rotational energy from the output shaft 228 of the second GRA 222 to the input shaft 212 of the first GRA 208, the example torque tube assembly 200 is employed. As the output shaft 228 of the second GRA 222 rotates, the rotational power is transferred to the input shaft 212 of the first GRA 208 via the torque tube assembly 200. Torque tube assemblies may be similarly employed between each of the actuators (e.g., rack and pinion assemblies) of each of the slats 108-120. For example, the seventh slat 120 (FIG. 1), which is the most inboard slat, includes an actuator (e.g., a pinion gear and GRA) that is driven by the PDU 128 (FIG. 1). An output of the actuator is operatively coupled to another actuator of the seventh slat 120 or to an actuator of the sixth slat 118 via a torque tube assembly, and so forth. Therefore, the input shaft 226 of the second GRA (and, thus, the second pinion gear 220) is rotated via an upstream torque tube assembly operatively coupled to an inboard actuator of the second slat 110 or from actuator of the third slat 112 (e.g., depending on how many actuators are used for each of the slats 108-120). Similarly, the output shaft 214 of the first GRA 208 may be operatively coupled to another actuator of the first slat 108 via an example torque tube assembly.

Figure 3:
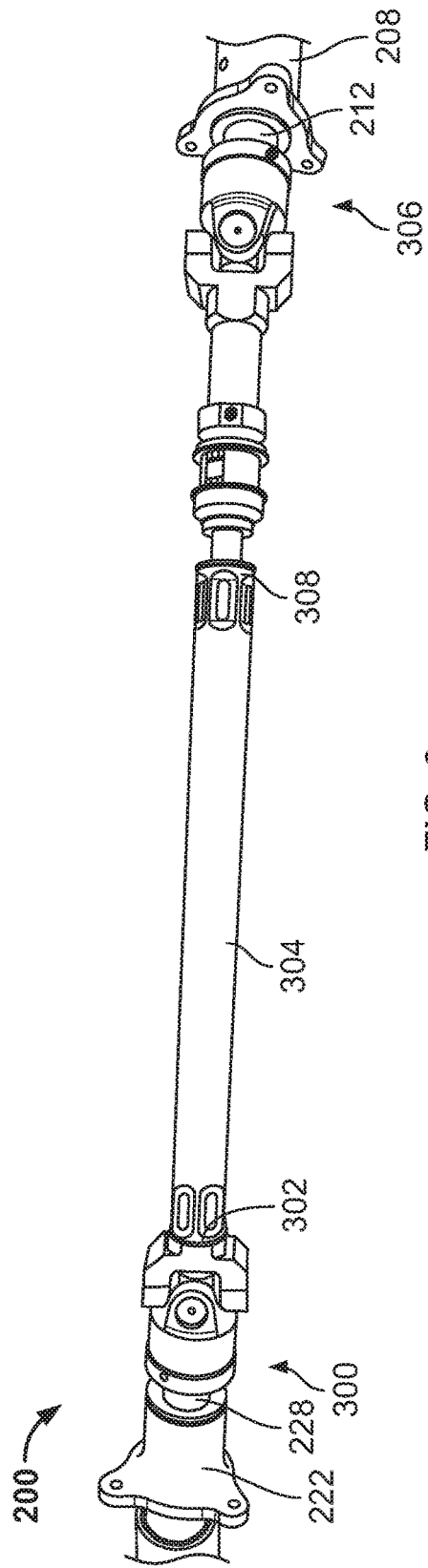
FIG. 3 is a perspective view of the example torque tube assembly of FIG. 2 having a first example joint and a second example joint.

FIG. 3 is an isolated view of the example torque tube assembly 200 coupled between the output shaft 228 of the second GRA 222 and the input shaft 212 of the first GRA 208. In the illustrated example, the torque tube assembly 200 includes a first joint 300 that couples a first end 302 of a torque tube 304 to the output shaft 228 of the second GRA 222. The torque tube assembly 200 also includes a second joint 306 between a second end 308 of the torque tube 304 and the input shaft 212 of the first GRA 208. The torque tube 304 may be any length desired. While in many of the examples disclosed herein the torque tube assembly 200 is describe as being between drive shafts of two actuators, in other examples, one or more torque tube supports may be located between two actuators or driving mechanisms (e.g., when a distance between two actuators is relatively long). Therefore, in some examples, the torque tube assembly 200 may be split or divided into additional torque tube assemblies. For example, instead of being coupled to an input/output shaft (e.g., of an upstream or downstream actuator), the first and/or second joints 300, 306 of the torque tube assembly 200 may be coupled to a splined shaft at a torque tube support (e.g., a rib or support in the wing).

Figure 4:
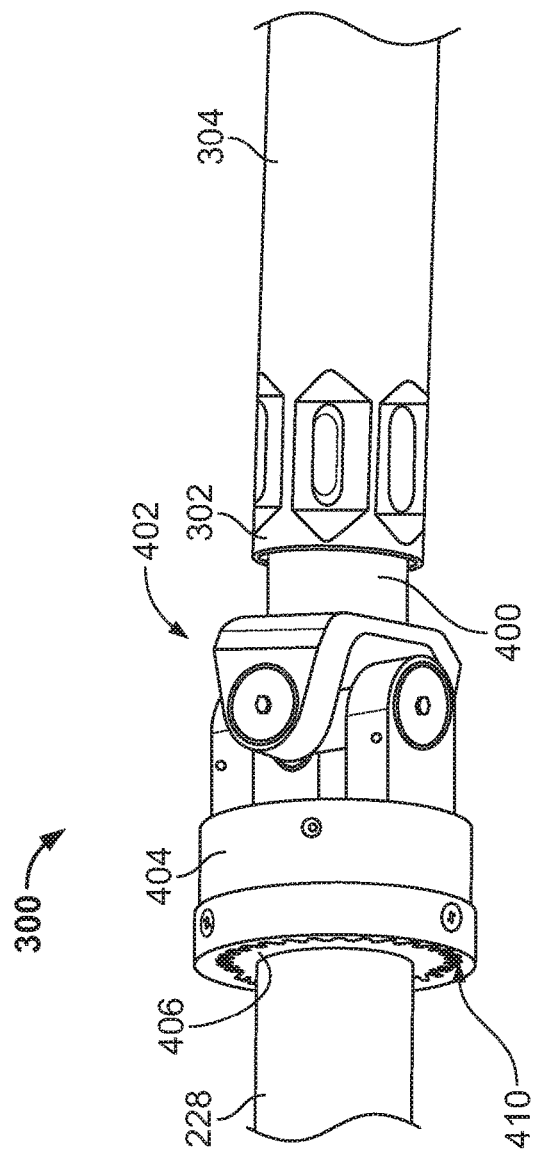
FIG. 4 is an enlarged perspective view of the first example joint of FIG. 3 employing an example spline coupling to receive an example spline gear.
Figure 5:
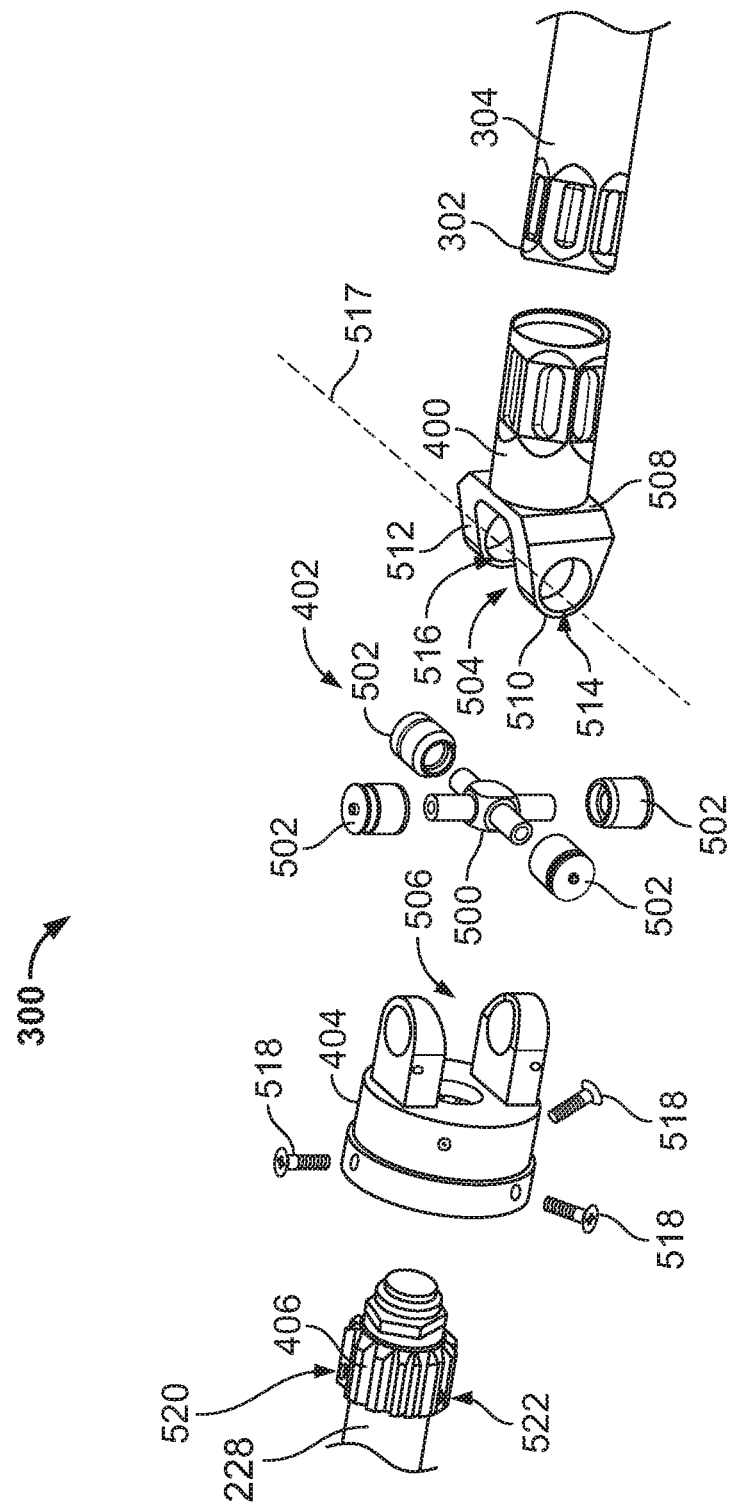
FIG. 5 is an exploded view of the first example joint of FIG. 4.

FIG. 4 is an enlarged view of the first joint 300 and FIG. 5 is an exploded view of the first joint 300. As shown in the illustrated example, the first end 302 of the torque tube 304 is coupled to a first torque tube fitting 400 (referred to herein as the first fitting 400). In the illustrated example, the first fitting 400 is fixedly coupled to the first end 302 of the torque tube 304 by an electromagnetic fitting or forming (EMF) process. An example EMF process for coupling an end fitting to an end of a torque tube is described in U.S. Pat. No.

5,983,478, which is incorporated herein by reference in its entirety. EMF produces excellent rigid torque transmitting couplings between an end of a torque tube and an end fitting. In other examples, the first fitting 400 may be coupled to the first end 302 of the torque tube 304 using other mechanical and/or chemical techniques (e.g., welding, threaded fasteners, adhesives, etc.).

In the illustrated example, the first fitting 400 forms a first U-joint 402 with a first spline coupling 404. As shown more clearly in FIG. 5, the first U-joint 402 includes a cross-journal 500 (e.g., a spider) and four bearing caps 502 (which include an array of needle bearings) that are coupled between a first yoke 504 (e.g., a fork) on the first fitting 400 and a second yoke 506 on the first spline coupling 404. The first fitting 400 has a wall or plate 508 and a first ear 510 and a second ear 512 that extend from the plate 508 to form the first yoke 504. The first and second ears 510, 512 have respective first and second openings 514, 516 that are coaxially aligned along an axis 517. The first and second openings 514, 516 receive two of the bearing caps 502 of the cross-journal 500. In the illustrated example, the first yoke 504 is integral with the first fitting 400 and, thus, form a substantially unitary piece or structure. However, in other examples, the first yoke 504 and the first fitting 400 may be constructed of multiple pieces that are operatively coupled to each other.

As illustrated in FIGS. 4 and 5, a first spline gear 406 is coupled to the output shaft 228 of the second GRA 222 (FIG. 3). In some examples, the first spline gear 406 is integral with the output shaft 228 (e.g., constructed as a single unitary part or component). The first spline gear 406 is coupled to the first spline coupling 404. In particular, the first spline gear 406 is received within a bore or opening 410 of the first spline coupling 404.

Figure 6:
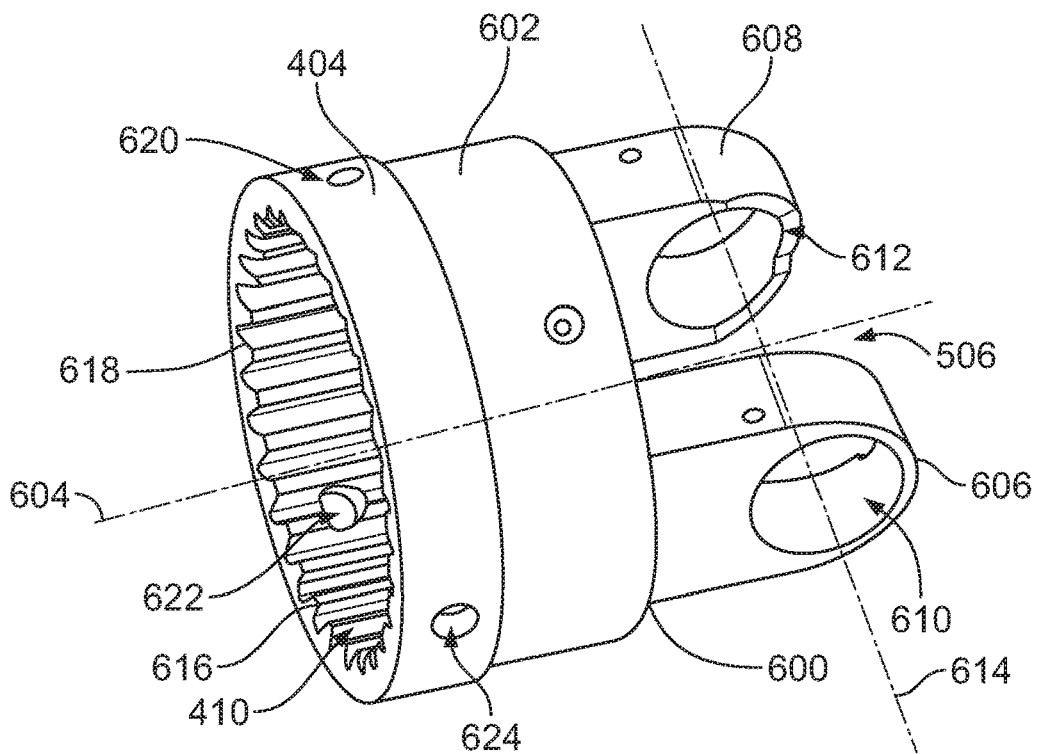
FIG. 6 is an isolated perspective view of the example spline coupling of FIG. 4.
Figure 7:
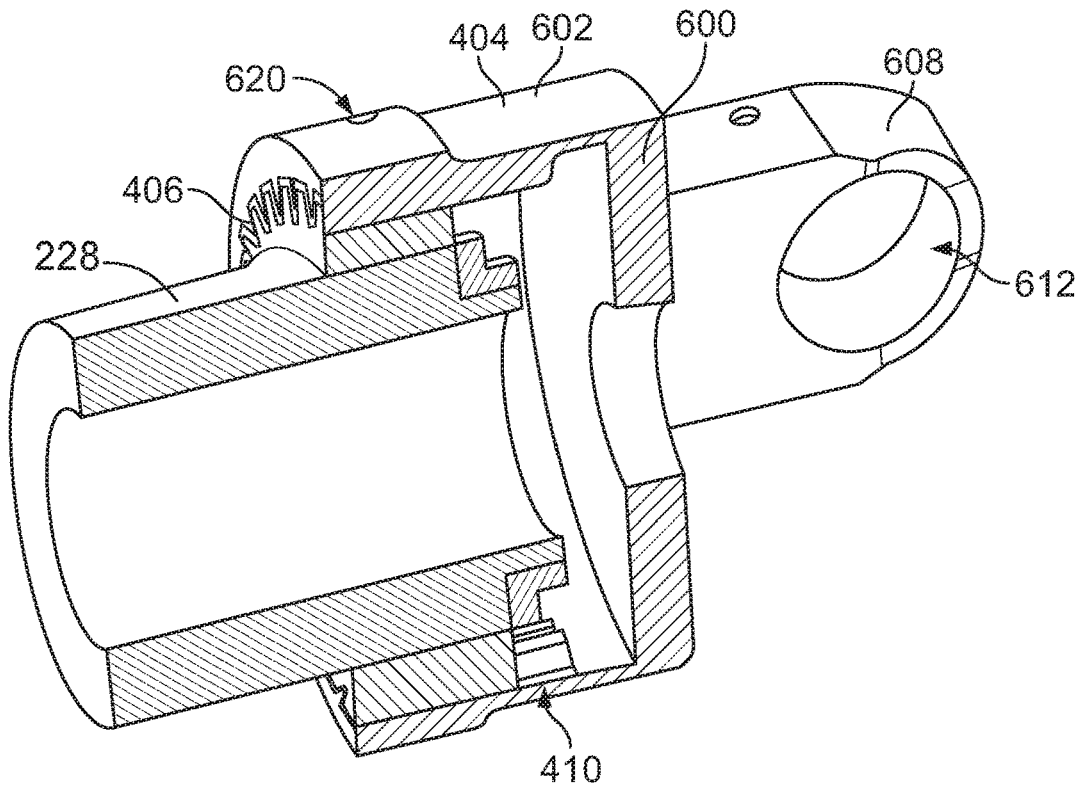
FIG. 7 is a cross-sectional view of the example spline coupling and the example spline gear of FIG. 4.

FIG. 6 is an isolated perspective view of the first spline coupling 404 and FIG. 7 is a cross-sectional view of the first spline gear 406 inserted into the first spline coupling 404. As shown in FIGS. 6 and 7, the first spline coupling 404 includes a wall or plate 600. An annular wall 602 extends from the plate 600 to define the opening 410, which is aligned with a longitudinal axis 604 of the first spline coupling 404. The first spline coupling 404 includes a first ear 606 and a second ear 608 extending from the plate 600 that form the second yoke 506 (e.g., in a direction opposite to that of the annular wall 602). The first and second ears 606, 608 have respective first and second openings 610, 612 that are coaxially aligned along an axis 614. In the illustrated example, the axis 614 is perpendicular to the longitudinal axis 604. The first and second openings 610, 612 receive two of the bearing caps 502 (FIG. 5) of the cross-journal 500. As shown in FIG. 6, the opening 410 of the first spline coupling 404 includes splines 616 (e.g., ribs, grooves, channels) around an inner surface 618 of the annular wall 602. In the illustrated example, the first spline coupling 404 (including the second yoke 506) is a substantially unitary piece or structure. However, in other examples, the first spline coupling 404 may be constructed of multiple pieces that are operatively coupled to each other.

In the illustrated example, the first spline coupling 404 includes three holes or apertures 620, 622, 624 that extend through the annular wall 602 into the opening 410 (e.g., in a direction perpendicular to the longitudinal axis 604). The holes 620, 622, 624 are to receive threaded fasteners 518 (FIG. 5) to couple the first spline gear 406 to the first spline coupling 404. In the illustrated example, the holes 620, 622, 624 are equally spaced around the annular wall 602 (e.g., 120° degrees apart from each other). In other examples, the first spline coupling 404 may include more or fewer holes and/or the holes may be spaced differently.

As shown in FIGS. 5 and 7, the first spline gear 406 has three holes (two of which are seen in FIG. 5 and labeled as 520 and 522), which are to be aligned with the holes 620, 622, 624 of the first spline coupling 404. For example, as shown in FIG. 7, the first spline gear 406 is inserted into the opening 410 of the first spline coupling 404. The three holes of the first spline gear 406 are aligned with the respective holes 620, 622, 624 of the first spline coupling 404. The threaded fasteners 518 (FIG. 5) are threaded into the holes 620, 622, 624 and into the corresponding holes of the first spline gear 406 to couple the first spline gear 406 and the first spline coupling 404. The threaded fasteners 518 may be bolts, screws, or any other suitable fastening mechanisms.

Figure 8:
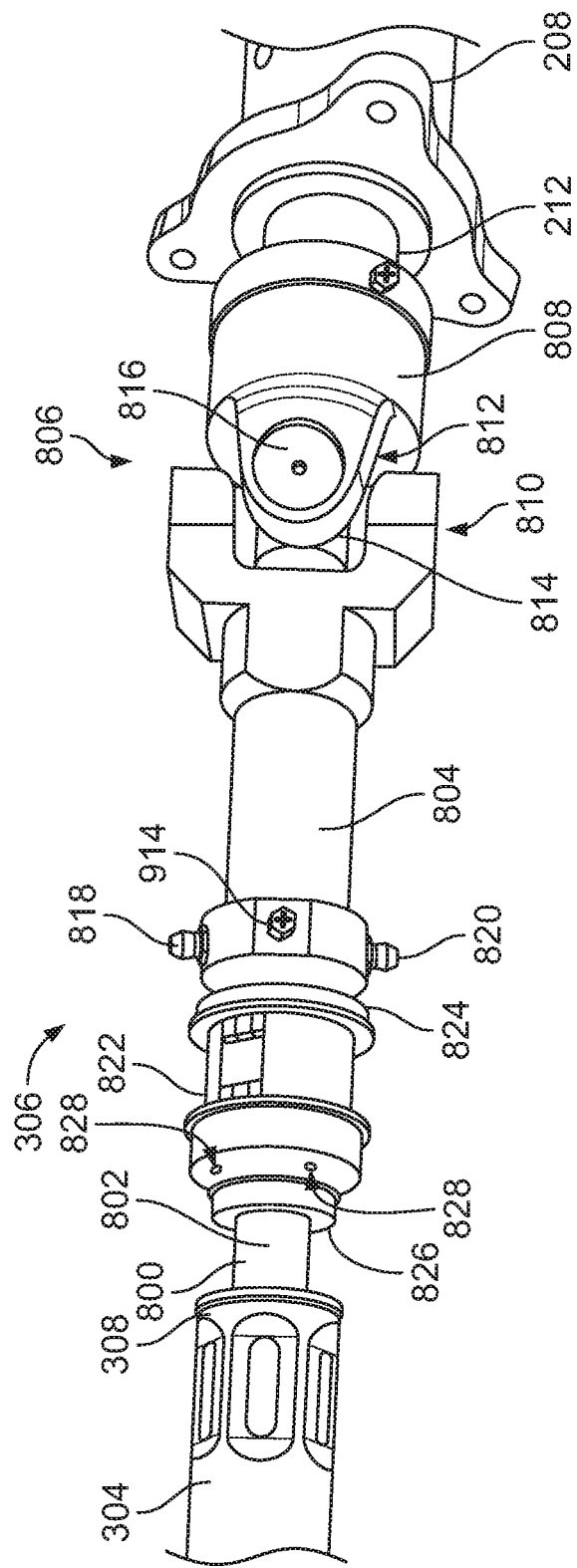
FIG. 8 is an enlarged perspective view of the second example joint of FIG. 4 employing an example sliding splined shaft.
Figure 9:
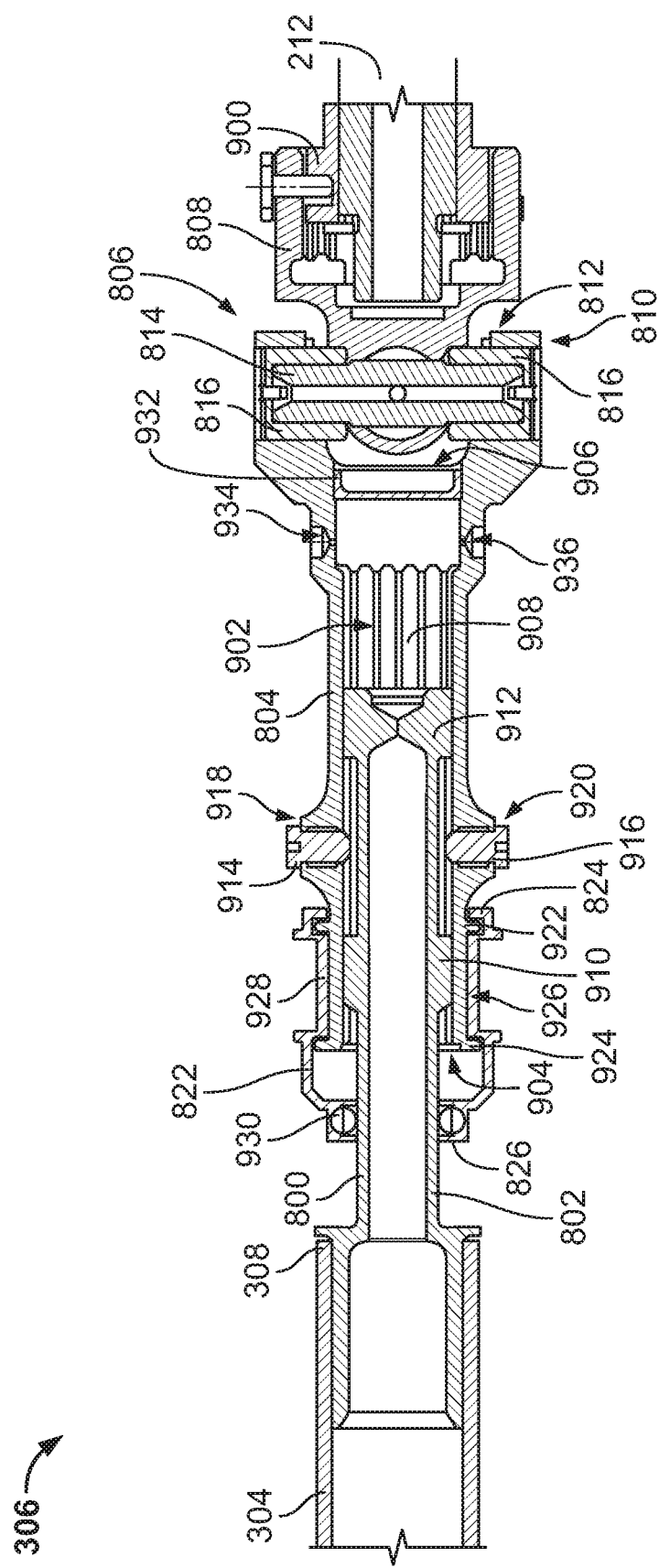
FIG. 9 is a cross-sectional view of the second example joint of FIG. 8.
Figure 10:
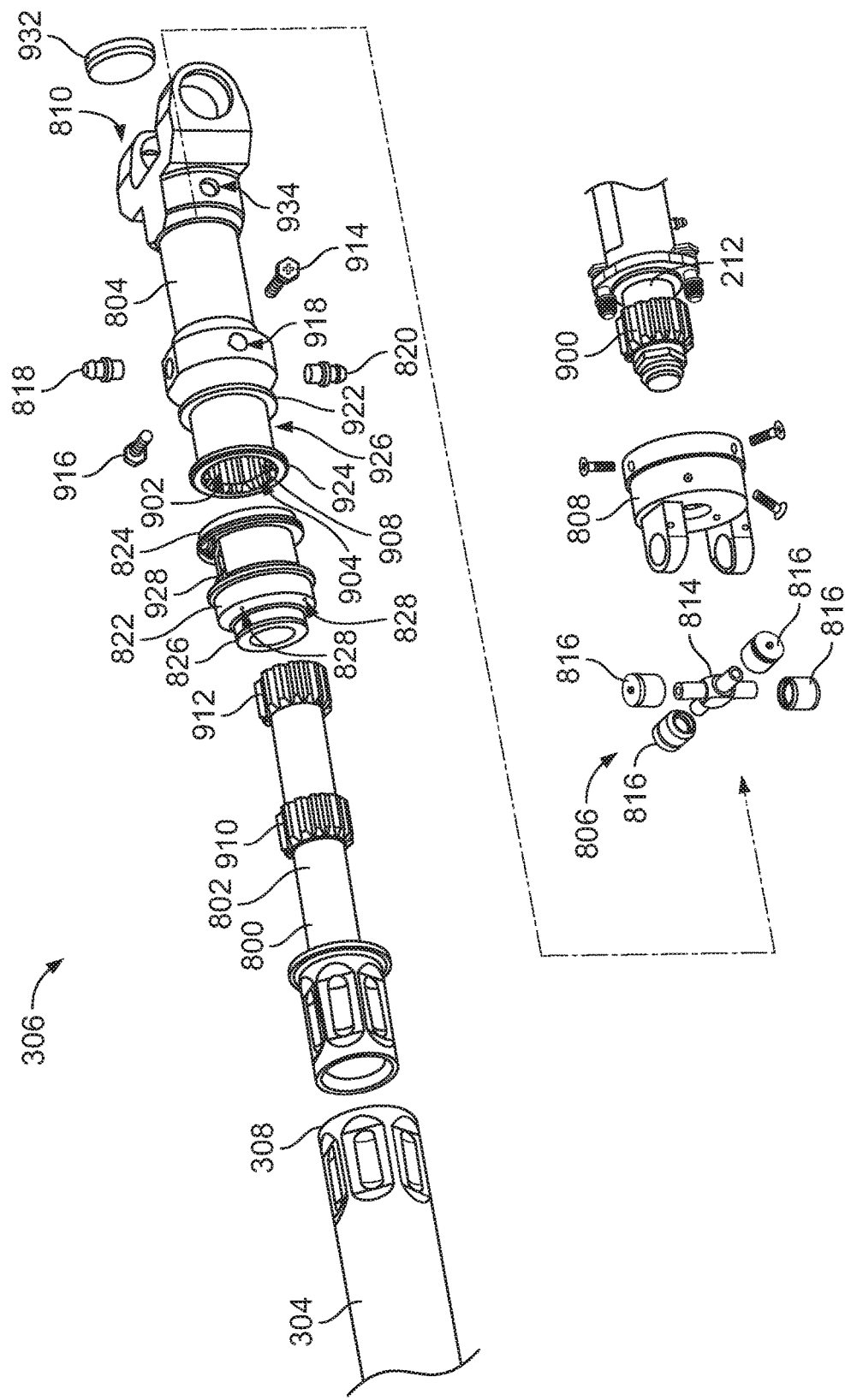
FIG. 10 is an exploded view of the second example joint of FIG. 8.

FIG. 8 is an enlarged view of the second joint 306, FIG. 9 is a cross-sectional via of the second joint 306, and FIG. 10 is an exploded view of the second joint 306. In the illustrated example, a second torque tube fitting 800 (referred to herein as the second fitting 800, and which may also be referred to as a slider or spline) is coupled to the second end 308 of the torque tube 304. Similar to the first fitting 400 (FIG. 4), the second fitting 800 may be coupled to the second end 308 of the torque tube 304 by an EMF process. In other examples, the second fitting 800 may be coupled to the second end 308 of the torque tube 304 via another mechanical and/or chemical fastening technique. In the illustrated example, the second torque tube fitting 800 includes a shaft 802 that is slidably received within a sliding spline shaft 804, discussed in further detail below.

In the illustrated example of FIGS. 8-10, the second joint 306 of the torque tube assembly 200 includes the sliding spline shaft 804. The sliding spline shaft 804 forms a second U-joint 806 with a second spline coupling 808. In particular, the sliding spline shaft 804 includes a third yoke 810, the second spline coupling 808 includes a fourth yoke 812, and a cross-journal 814 with four bearing caps 816 is disposed between the third and fourth yokes 810, 812.

As shown in FIGS. 9 and 10, a second spline gear 900, which is coupled to the input shaft 212 of the first GRA 208 (FIGS. 2 and 3), is received within and coupled to the second spline coupling 808. Thus, the second spline coupling 808 is coupled to the input shaft 212 of the first GRA 208. The second spline coupling 808 may be fixedly coupled to the second spline gear 900 via threaded fasteners (e.g., three bolts), similar to the connection between the first spline coupling 404 (FIGS. 5-7) and the first spline gear 406. In fact, in this example, the third yoke 810 of the sliding spline shaft 804 is substantially the same as the first yoke 504 (FIG. 5) of the first fitting 400 (FIG. 5), the cross-journal 814 and the bearing caps 816 are substantially the same as the cross-journal 500 and the bearing caps 502 (FIG. 5), the second spline coupling 808 is substantially the same as the first spline coupling 404 (FIGS. 5-7), and the second spline gear 900 is substantially the same as the first spline gear 406 (e.g., the second spline gear 900 includes splines and openings to received threaded fasteners). Thus, to avoid redundancy, a description of the second U-joint 806 and the connection between the sliding spline shaft 804, the second spline coupling 808, and the second spline gear 900 is not provided herein. Instead, the interested reader is directed to the description above relating to the first U-joint 402 (FIG. 4) and the connection between the first fitting 400, the first spline coupling 404, and the first spline gear 406 on the output shaft 228. In some examples, instead of using the first and second spline gears 406, 900, the input and output shafts 212, 228 may instead be splined and sized to fit within the first and second spline couplings 404, 808, respectively.

Therefore, in this example, the first spline coupling 404 (FIG. 4) (one end of the torque tube assembly 200) is fixedly coupled to the output shaft 228 (FIG. 3) of the second GRA 222 and the second spline coupling 808 is fixedly coupled to the input shaft 212 of the first GRA 208. In some examples, six threaded fasteners (e.g., bolts) are used to fixedly couple the ends of the torque tube assembly 200 to the aircraft 100 (three for the first spline coupling 404 and three for the second spline coupling 808). Therefore, in some examples, only one screwdriver or socket wrench may be needed to attach the ends of the torque tube assembly 200 to the aircraft 100, as compared to known bolted flange/plate assemblies that require multiple screwdrivers or wrenches (one for the bolt heat and one for the nut) and which require additional space to fit the additional tools. In other examples, more or fewer threaded fasteners may be used to couple the ends of the torque tube assembly 200 to the aircraft 100.

The second fitting 800 is axially movable within a channel (e.g., an opening, a passageway, etc.) formed in the sliding spline shaft 804. For example, as illustrated in FIG. 9, a channel 902 (e.g., a splined channel) is formed between a first opening 904 (on one end of the sliding spline shaft 804) and a second opening 906 (on the opposite end of the sliding spline shaft 804, which opens between the ears of the third yoke 810). The channel 902 and the first opening 904 are also shown in FIG. 10.

As illustrated in FIGS. 9 and 10, the sliding spline shaft 804 includes splines 908 (e.g., ribs, grooves, channels) on an inner surface of the channel 902. The second fitting 800 includes first and second spline sections 910, 912 extending radially from the shaft 802. The first and second spline sections 910, 912 mesh with the splines 908 in the channel 902, which enables the second fitting 800 and the sliding spline shaft 804 to slide relative to each other while still transferring rotational motion between each other. In other words, the shaft 802 of the second fitting 800 is axially slidable within the channel 902, but not rotatable within the channel 902. This sliding interaction enables the torque tube assembly 200 to lengthen or shorten when the first wing 104 (FIG. 2) of the aircraft 100 flexes, thereby reducing longitudinal loads on the torque tube assembly 200. For example, the torque tube assembly 200 can be considered as two portions: a first portion including the first spline coupling 404, the first fitting 400, the torque tube 304, and the second fitting 800; and a second portion including the sliding spline shaft 804 and the second spline coupling 808. While the first portion is connected to the aircraft 100 at the second GRA 222 and the second portion is connected to the aircraft 100 at the first GRA 208, the two portions can slide or move axially relative to each other, thereby enabling the torque tube assembly 200 (FIG. 2) to move axially (e.g., longitudinally) as the first wing 104 (FIG. 2) flexes or bends, while still transferring rotational motion between the second GRA 222 to the first GRA 208. Additionally, the U-joints 300, 306 enable the torque tube assembly 200 to move angularly with respect the output shaft 228 of the second GRA 222 and the input shaft 212 of the first GRA 208 (e.g., if the output shaft 228 and the input shaft 212 become misaligned). Therefore, the torque tube assembly 200 can be displaced angularly and/or axially and, thus, less strain or adverse forces are imparted on the torque tube assembly 200 than experienced in known assemblies.

In some examples, to prevent the second fitting 800 and the sliding spline shaft 804 from completely disconnecting from each other, the example torque tube assembly 200 may include one or more retaining elements. The retaining element(s) may block, contact, and/or otherwise prevent the second fitting 800 from completely exiting the sliding spline shaft 804 and becoming disconnected therefrom. In some examples, the retaining element(s) may be implemented as one or more bolt(s). For example, as illustrated in FIGS. 9 and 10, first and second retaining bolts 914, 916 are screwed into first and second openings 918, 920, respectively, in the sliding spline shaft 804. The first retaining bolt 914 is also shown in FIG. 8. The first and second retaining bolts 914, 916 extend into the channel 902 between the first and second spline sections 910, 912 (but, in some examples, do not engage the side of the shaft 802). If the second fitting 800 or the sliding spline shaft 804 is moved relative to the other beyond a threshold distance (e.g., defined by the distance between the first and second spline sections 910, 912), the first or second spline section 910, 912 engages the first and/or second retaining bolts 914, 916. For example, should the first portion of the torque tube assembly 200 become disconnected from the aircraft 100, the first portion remains connected to the second portion and, thus, the second portion (which is still connected to the aircraft 100) prevents the first portion from disconnecting from the aircraft 100. The same is true if the second portion became is disconnected from the aircraft 100. In some examples, the first and second spline sections 910, 912 are spaced apart a distance that is greater than the axial flexing that occurs during normal operation (e.g., around 0.6 inches). As a result, during normal operation, neither of the first or second spline sections 910, 912 contacts the first and second retaining bolts 914, 916. Instead, the first and second retaining bolts 914, 916 are only contacted if there is a failure of one or more parts of the torque tube assembly 200.

In the illustrated example, the first and second retaining bolts 914, 916 are disposed on opposite sides of the sliding spline shaft 804 (e.g., 180° apart). However, in other examples, the first and second retaining bolts 914, 916 may be spaced differently. In the illustrated example, two retaining bolts are implemented, which, in some examples, provides double redundancy (in case one retaining bolt fails). However, in other examples, only one retaining bolt may be used or more than two retaining bolts may be used. Further, in other examples, another retaining element, such as a pin (e.g., a non-threaded pin), may be used in addition to or as an alternative to the first and second retaining bolts 914, 916.

In some examples, grease is used in the channel 902 to lubricate the sliding interaction between the second fitting 800 and the sliding spline shaft 804. In some examples, grease may be injected into the channel 902 via first and second grease ports 818, 820 (FIGS. 8 and 10). When grease is injected into the channel 902, the grease seeps throughout the channel 902, which provides sliding lubrication between the first and second spline sections 910, 912 and the splines 908 of the sliding spline shaft 804. In the illustrated example, the first and second grease ports 818, 820 are on opposite sides of the sliding spline shaft 804. The first and second grease ports 818, 820 are disposed along the same cross-section of the sliding spline shaft 804 as the first and second retaining bolts 914, 916 and are offset from the bolts by 90°. In other examples, only one grease port may be provided or more than two grease ports may be provided and/or the grease ports may be provided in other locations.

As illustrated in FIGS. 8-10, the torque tube assembly 200 includes a grease retainer 822 (e.g., a cover) to prevent the grease from escaping out of the first opening 904 of the channel 902, while still enabling the second fitting 800 to move into and out of the channel 902. The grease retainer 822 is coupled to the sliding spline shaft 804 and covers the first opening 904 of the channel 902 where the second fitting 800 is inserted into the channel 902 (e.g., a junction of the first portion and the second portion of the torque tube assembly 200). The grease retainer 822 has a first end 824 and a second end 826 opposite the first end 824. The grease retainer 822 may be constructed of a relatively lightweight material such as nylon, for example. In other examples, the grease retainer 822 may be constructed of other materials.

As illustrated in FIGS. 9 and 10, the sliding spline shaft 804 includes a first rib 922 and a second rib 924 that form a groove 926. The grease retainer 822 includes an inwardly extending collar 928 near the first end 824 that fits within the groove 926. In some examples, a strap, band, cable, and/or other clamping member is wrapped around the outside of the collar 928 to hold the grease retainer 822 on the sliding spline shaft 804. In other examples, no strap, band, cable, or clamping member may be used. Instead, the grease retainer 822 may be rigid enough to remain seated in the groove 926 and, thus, remain coupled to the sliding spline shaft 804.

As illustrated in FIG. 9, the second end 826 of the grease retainer 822, which is disposed outward from (beyond) the end of the sliding spline shaft 804 (e.g., about 0.5 inches), extends inward toward the shaft 802 of the second fitting 800. The second end 826 of the grease retainer 822 includes a seal 930 (e.g., an o-ring) that provides sealing engagement between the grease retainer 822 and the shaft 802 to maintain the grease within the channel 902 (and/or contained within a small area outside of the channel 902). Further, the grease retainer 822 prevents moisture and other unwanted material from accumulating in the channel 902 and adversely affecting the surfaces of the splines (e.g., corroding the splines).

In some examples, to prevent grease from escaping from the second opening 906 of the channel 902 (on the right side in FIG. 9), a plug 932 (shown in FIGS. 9 and 10) is inserted into the channel 902 from the second opening 906. In some examples, the plug 932 is press fit into the channel 902. In other examples, the plug 932 may be coupled to the sliding spline shaft 804 via another mechanical and/or chemical fastening technique.

As illustrated in FIGS. 9 and 10, in some examples, to prevent over-pressurization of the channel 902, the sliding spline shaft 804 includes first and second grease release ports 934, 936 (e.g., vents). The first and second grease release ports 934, 936 are relatively small openings or orifices. The grease release ports 934, 936 are sized to enable the grease to escape from the channel 902 if pressure inside of the channel 902 becomes too high. Otherwise, the pressure inside of the channel 902 may cause the plug 932 and/or the grease retainer 822 to eject. While in the illustrated example two grease release ports are implemented, in other examples, only one grease release port may be implemented or more than two grease release ports may be implemented. Further, in other examples, the grease port(s) may be in other locations and/or spaced differently. Further, as illustrated in FIGS. 8 and 10, in some examples, the grease retainer 822 includes one or more grease release ports 828 (two of which are referenced in FIG. 8 and two of which are reference in FIG. 10), which are located near the second end 826. The grease release ports 828 similarly release over-pressurized or excess grease. In some examples, the grease retainer 822 includes four grease release ports 828 (e.g., spaced evenly around the grease retainer 822). In other examples, the grease retainer 822 may include more or fewer grease release ports and/or the grease release ports may be disposed in other locations.

Figure 11:
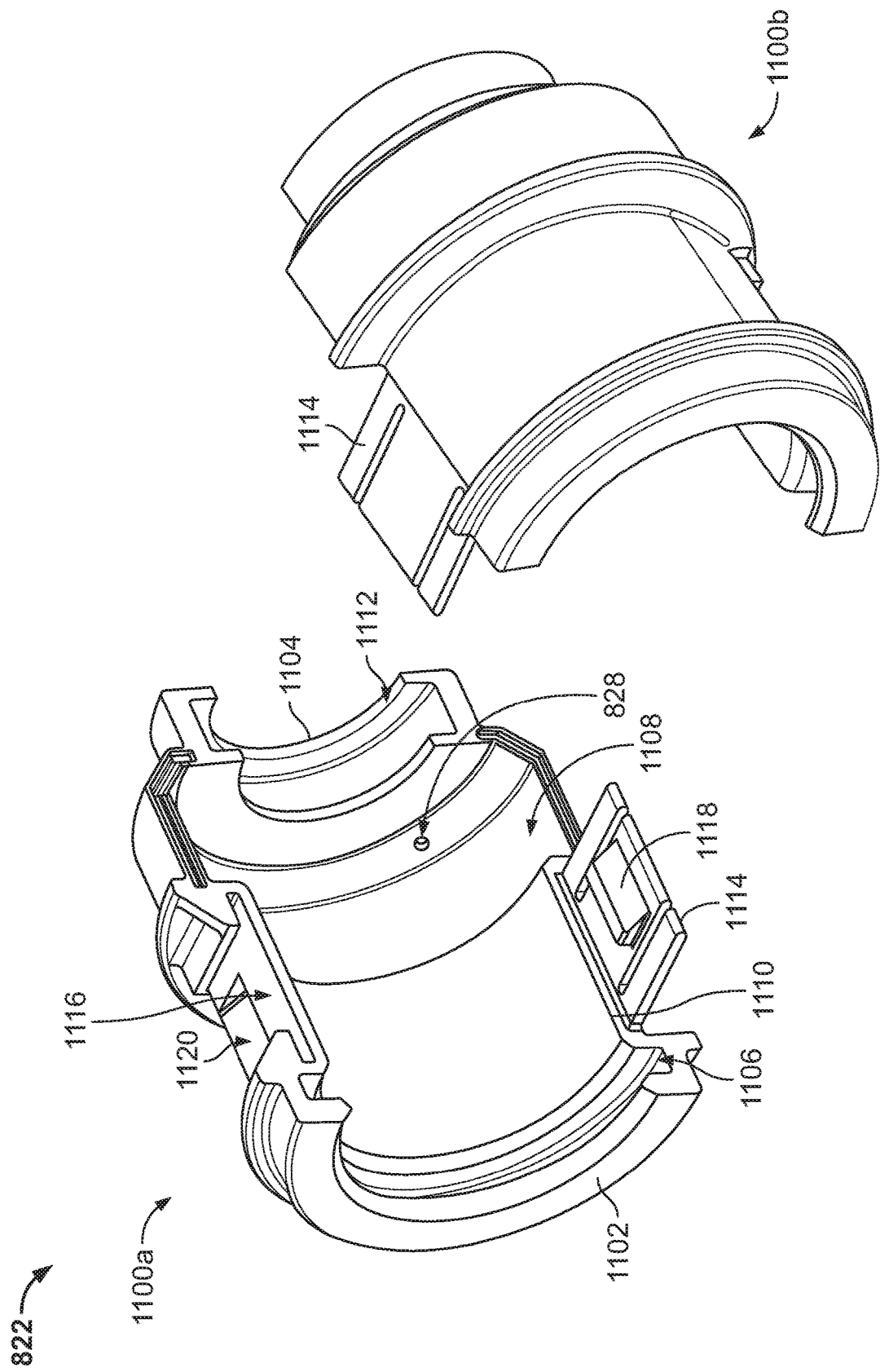
FIG. 11 is an exploded view of an example grease retainer that may be implemented on the example sliding spline shaft of FIG. 8.

In some examples, the grease retainer 822 is constructed of two pieces or parts that couple together to form the grease retainer 822. FIG. 11 illustrates an example implementation of the grease retainer 822 constructed of a first part 1100a and a second part 1100b. The first and second parts 1100a, 1100b are the same type of part (i.e., having the same shape, size, dimension, features, etc.). The first and second parts 1100a, 1100b are half cylinders that, when coupled, interlock to form a full cylinder. As such, during manufacture, only one type of part needs to be manufactured (e.g., one mold can be used to make multiple parts), and two of the parts can be assembled to form the grease retainer 822. Thus, the example grease retainer 822 can be manufactured inexpensively by making multiples copies of the same part. To avoid redundancy, only the details of the first part 1100a are described below. However, it is understood that the second part 1100b includes identical features.

In the illustrated example, the first part 1100a includes a first end 1102 and a second end 1104, which form the first end 824 (FIG. 8) and the second end 826 (FIG. 8), respectively, of the grease retainer 822 when connected to the second part 1100b. The first part 1100a includes first a first groove 1106 at or near the first end 1102 to receive the first rib 922 (FIGS. 9 and 10) on the sliding spline shaft 804. The first part 1100a also includes a second groove 1108 to receive the second rib 924 (FIGS. 9 and 10) on the sliding spline shaft 804. A collar portion 1110 is formed between the first groove 1106 and the second groove 1108. When the first and second parts 1100a, 1100b are coupled, the collar portions form the collar 928 (FIGS. 9 and 10), which is dimensioned to be received in the groove 926 on the sliding spline shaft 804. In the illustrated example, the first part 1100a also includes a third groove 1112 formed at or near the second end 1104. When the first and second parts 1100a, 1100b are coupled, the third groove forms a seal gland to receive the seal 930 (FIG. 9). One of the example grease release ports 828 is also shown in FIG. 11 on the first part 1100a.

To couple the first and second parts 1100a, 1100b, the first part 1100a includes a tab 1114 (e.g., a male extension) extending from one side of the collar portion 1110 and a slot 1116 (e.g., a female opening to receive a male extension, such as the tab 1114 of the second part 1100b) formed on the opposite side of the collar portion 1110. When the first and second parts 1100a, 1100b are coupled, the tab 1114 is to be inserted into the corresponding slot 1116 on the second part 1100b, and the slot 1116 receives the corresponding tab 1114 of the second part 1100b. To retain the first and second parts 1100a, 1100b together, the tab 1114 includes a clip 1118 (e.g., a ledge, a lip, a tang, etc.) that extends radially inward from the tab 1114 and rearward from the tab 1114 (in a direction opposite the direction in which the tab 1114 extends). Further, the slot 1116 includes a clip opening 1120 to receive the corresponding clip 1118 on the second part 1100b. When the corresponding tab 1114 of the second part 1100b is inserted into the slot 1116 of the first part 1100a (and vice versa), the corresponding clip 1118 slides into the clip opening 1120 and prevents the first and second parts 1100a, 1100b from being pulled apart (unless the clips 1118 are moved, for example, outward from the clip openings 1120). In other examples, the grease retainer 822 may be constructed of a single unitary piece (e.g., using a flexible material such as rubber) or more than two pieces.

Figure 12:
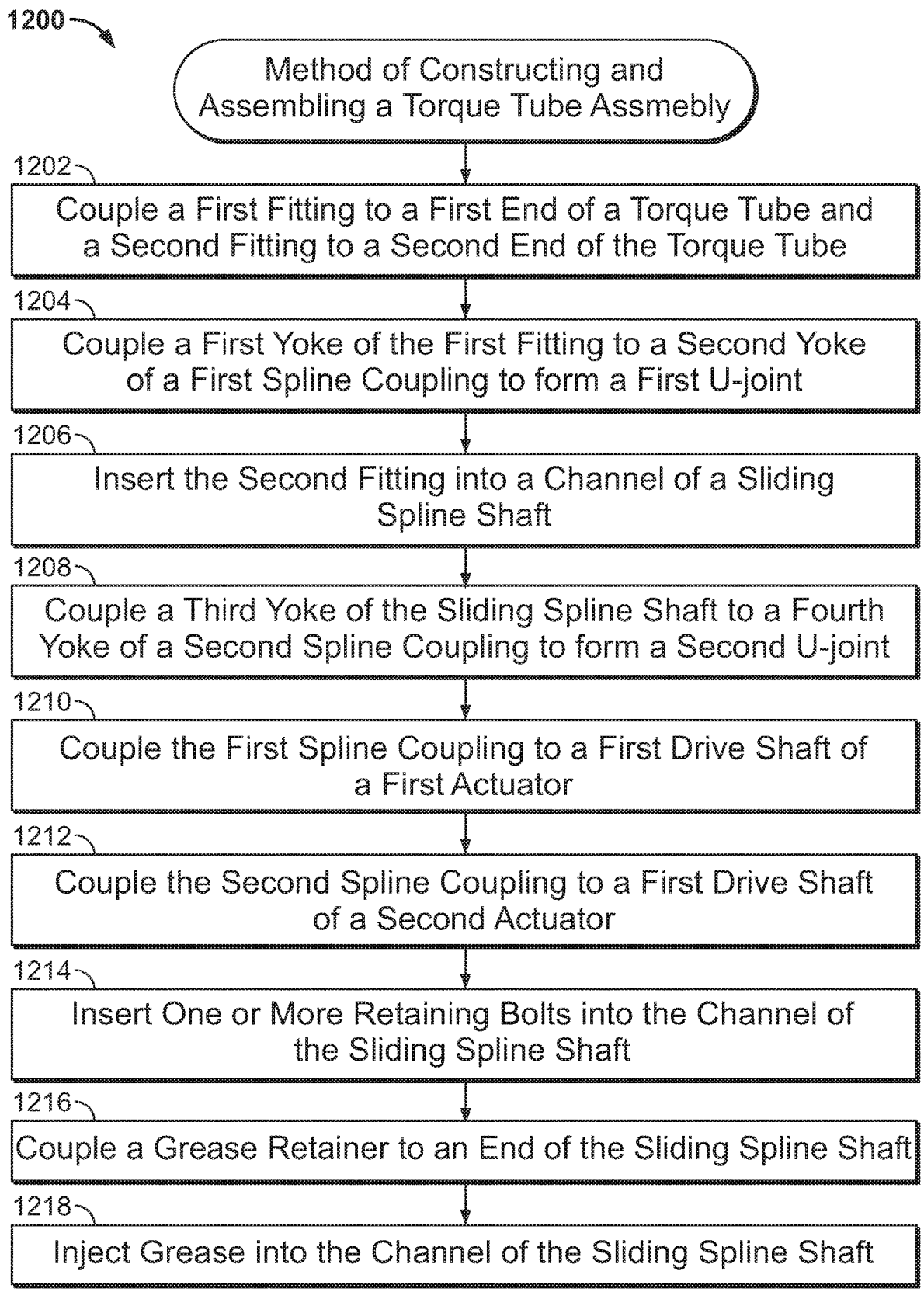
FIG. 12 is an example method for constructing and/or assembling an example torque tube assembly.

FIG. 12 is a flowchart representative of an example method 1200 that may be implemented to construct and/or assemble an example torque tube assembly, such as the example torque tube assembly 200 of FIG. 2. At block 1202, the first fitting 400 is coupled to the first end 302 of the torque tube 304 and the second fitting 800 is coupled to the second end 308 of the torque tube 304. In some examples, the first and/or second fittings 400, 800 are coupled to the torque tube 304 via EMF. In some examples, the torque tube 304 is constructed of aluminum and the first and second fittings 400, 800 are constructed of steel. However, in other examples, the torque tube 304 and/or the first and/or second fittings 400, 800 may be constructed of other materials. Further, in other examples, the first and second fittings 400, 800 may be coupled to the torque tube 304 via other coupling techniques (e.g., welding, threaded fasteners, etc.).

At block 1204, the first yoke 504 of the first fitting 400 is coupled (e.g., via the cross-journal 500 and the bearing caps 502) to the second yoke 506 of the first spline coupling 404 to form the first U-joint 402. At block 1206, the second fitting 800 is inserted into the channel 902 of the sliding spline shaft 804. In particular, the first and second spline sections 910, 912 are inserted into the splines 908 of the channel 902. At block 1208, the third yoke 810 of the sliding spline shaft 804 is coupled (e.g., via the cross-journal 814 and the bearing caps 816) to the fourth yoke 812 of the second spline coupling 808 to form the second U-joint 806.

At block 1210, the first spline coupling 404 is coupled to the aircraft 100 via the output shaft 228 of the second GRA 222. For example, the first spline coupling 404 may be slid onto the first spline gear 406 to insert the first spline gear 406 into the opening 410 of the first spline coupling 404. In some examples, after the first spline gear 406 is inserted into the first spline coupling 404, the threaded fasteners 518 are screwed into the first spline coupling 404 and the first spline gear 406 to fixedly couple the first spline coupling 404 (and, thus, the first portion of the torque tube assembly 200) to the aircraft 100.

At block 1212, the second spline coupling 808 is coupled to the aircraft 100 via the input shaft 212 of the first GRA 208. For example, after coupling the first spline coupling 404 to the first spline gear 406, the sliding spline shaft 804 (e.g., the second portion) may be moved toward the torque tube 304 to compress or shorten the torque tube assembly 200. The second spline coupling 808 may be lifted to a position where it is aligned with the second spline gear 900, and the sliding spline shaft 804 may be moved away from the torque tube 304 (lengthening the torque tube assembly 200) to slide the second spline coupling 808 onto the second spline gear 900. In other examples, the second spline coupling 808 may be coupled to the input shaft 212 of the first GRA 208 first. After the second spline gear 900 is inserted into the second spline coupling 808, one or more threaded fasteners may be screwed into the second spline coupling 808 and the second spline gear 900 to fixedly couple the second spline coupling 808 (and, thus, the second portion of the torque tube assembly 200) to the aircraft 100.

At block 1214, the first and second retaining bolts 914, 916 are inserted into the channel 902 of the sliding spline shaft 804, which prevents the second fitting 800 and the sliding spline shaft 804 from becoming completely disconnected. For example, the first and second retaining bolts 914, 916 may be screwed in the first and second openings 918, 920, respectively, in the sliding spline shaft 804. At block 1216, the grease retainer 822 is coupled to the sliding spline shaft 804 to cover the first opening 904. In some examples, the grease retainer 822 is constructed of two parts that connect (interlock). In some examples, a strap or band is placed around the grease retainer 822 to ensure the grease retainer 822 does not become loose. In other examples, no strap or band may be used. At block 1218, grease may be injected into the channel 902 through the first and/or second grease ports 818, 820. The grease provides lubrication between the first and second spline sections 910, 912 of the second fitting 800 and the splines 908 of the channel 902.

Although the example method 1200 is described with reference to the flowchart illustrated in FIG. 12, many other methods of manufacturing and/or assembly the example torque tube assembly 200 of FIG. 2 may alternatively be used. For example, the order of execution of the blocks may be changed, and/or some of the blocks described may be changed, eliminated, or combined. Similarly, additional operations may be included in the manufacturing and/or assembly process before, in between, or after the blocks shown in FIG. 12. Further, although the first spline coupling 404 is described as being coupled to the output of a driving member and the second spline coupling 808 is described as being coupled to a driven member, it is understood that the torque tube assembly 200 may be used in reverse. In other words, the second spline coupling 808 may be coupled to a splined shaft of a driving member, which thereby drives the second spline coupling 808. Additionally, although the example torque tube assembly 200 is disclosed in relation to high lift devices of an aircraft, the example torque tube assembly 200 may be used in any industry or application where rotational energy is transferred from one drive member (e.g., a drive shaft) to another.

From the foregoing, it will be appreciated that the above disclosed torque tube assemblies and methods of making the same provide a more flexible attachment between an upstream drive shaft and a downstream drive shaft in a wing of an aircraft. In particular, example torque tube assemblies can move axially and angularly to adapt to any flexing and/or bending that may occur in a wing of an aircraft or other structure to which the torque tube assemblies are connected. As a result, less force or tension is concentrated along the torque tube assembly, thereby improving the structural integrity of the torque tube assembly. Also, example torque tube assemblies are easier to install than known torque tube assemblies because the example torque tube assemblies can be shortened and lengthened while attaching the ends of the torque tube assembly to the drive shafts. Further, example torque assemblies include a retaining feature that prevents parts from departing from the aircraft should one portion of the torque tube assembly fail.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:
1. A torque tube assembly comprising:
a torque tube having a first end and a second end opposite the first end, a first fitting coupled to the first end and a second fitting coupled to the second end, the first fitting to be coupled to a first high lift device of an aircraft, the second fitting having a spline section;
a sliding spline shaft having a channel, the second fitting slidably received within the channel, the sliding spline shaft including a grease port to enable grease to be injected into the channel, the sliding spline shaft having a first yoke; and
a spline coupling having a second yoke, the second yoke of the spline coupling coupled to the first yoke of the sliding spline shaft to form a U-joint, the spline coupling having an annular wall with splines around a surface of the annular wall, the spline coupling to be coupled to a second high lift device of the aircraft.

2. The torque tube assembly of claim 1, further including a retaining bolt extending into the channel, the retaining bolt to prevent the second fitting from sliding beyond a threshold distance into or out of the channel of the sliding spline shaft.

3. The torque tube assembly of claim 2, wherein the spline section is a first spline section, the second fitting further including a second spline section spaced apart from the first spline section, the retaining bolt extending into the channel between the first and second spline sections.

4. The torque tube assembly of claim 1, further including a grease retainer coupled to the sliding spline shaft and covering an opening of the channel to maintain the grease in the channel of the sliding spline shaft.

5. The torque tube assembly of claim 4, wherein the grease retainer includes a first part and a second part, each of the first part and the second part including a tab and a slot that is to mate with the corresponding tab and slot of the other one of the first part or the second part.

6. The torque tube assembly of claim 4, further including a seal between the grease retainer and the second fitting.

7. The torque tube assembly of claim 1, wherein the sliding spline shaft includes a grease release port.

8. The torque tube assembly of claim 1, wherein the spline coupling is a first spline coupling, the U-joint is a first U-joint, and the first fitting on the torque tube has a third yoke, and further including a second spline coupling with a fourth yoke, the fourth yoke of the second spline coupling coupled to the third yoke of the first fitting to form a second U-joint, the second spline coupling to be coupled to the first high lift device of the aircraft.

9. The torque tube assembly of claim 1, wherein the channel in the sliding spline shaft extends between a first opening in the sliding spline shaft and a second opening in the sliding spline shaft, the second fitting extending into the channel through the first opening.

10. The torque tube assembly of claim 9, further including a plug in the second opening to prevent the grease from escaping from the second opening.

11. A torque tube assembly comprising:
- a torque tube having a first end and a second end opposite the first end, a first fitting coupled to the first end and a second fitting coupled to the second end, the first fitting to be coupled to a first high lift device of an aircraft, the second fitting having a spline section;
- a sliding spline shaft having a channel, the second fitting slidably received within the channel, the sliding spline shaft having a first yoke;
- a first spline coupling having a second yoke, the second yoke of the first spline coupling coupled to the first yoke of the sliding spline shaft to form a first U-joint, the first spline coupling having an annular wall with splines around a surface of the annular wall, the first spline coupling to be coupled to a second high lift device of the aircraft, wherein the first fitting on the torque tube has a third yoke; and
- a second spline coupling with a fourth yoke, the fourth yoke of the second spline coupling coupled to the third yoke of the first fitting to form a second U-joint, the second spline coupling to be coupled to the first high lift device of the aircraft, wherein the first and second spline couplings include apertures to receive threaded fasteners to fixedly couple the first and second spline couplings to drive shafts of the first and second high lift devices, respectively.

12. A torque tube assembly comprising:
- a torque tube having a first end and a second end opposite the first end, a first fitting coupled to the first end and a second fitting coupled to the second end, the first fitting to be coupled to a first high lift device of an aircraft, the second fitting having a spline section;
- a sliding spline shaft having a channel, the second fitting slidably received within the channel, the sliding spline shaft having a first yoke;
- a retaining bolt extending into the channel, the retaining bolt to prevent the second fitting from sliding beyond a threshold distance into or out of the channel of the sliding spline shaft, wherein the second fitting and the sliding spline shaft are axially slidable relative to each other while the retaining bolt is in the channel; and
- a spline coupling having a second yoke, the second yoke of the spline coupling coupled to the first yoke of the sliding spline shaft to form a U-joint, the spline coupling having an annular wall with splines around a surface of the annular wall, the spline coupling to be coupled to a second high lift device of the aircraft.

13. A torque tube assembly comprising:
- a torque tube having a first end and a second end opposite the first end, a first fitting coupled to the first end and a second fitting coupled to the second end, the first fitting to be coupled to a first high lift device of an aircraft, the second fitting having a first spline section and a second spline section spaced apart from the first spline section;
- a sliding spline shaft having a channel, the second fitting slidably received within the channel, the sliding spline shaft having a first yoke;
- a retaining bolt extending into the channel between the first and second spline sections, the first and second spline sections spaced from each other by a distance that is greater than a width of the retaining bolt, the retaining bolt to prevent the second fitting from sliding beyond a threshold distance into or out of the channel of the sliding spline shaft; and
- a spline coupling having a second yoke, the second yoke of the spline coupling coupled to the first yoke of the sliding spline shaft to form a U-joint, the spline coupling having an annular wall with splines around a surface of the annular wall, the spline coupling to be coupled to a second high lift device of the aircraft.

14. A method comprising:
- coupling a first fitting to a first end of a torque tube and a second fitting to a second end of the torque tube opposite the first end of the torque tube, the first fitting having a first yoke, the second fitting having a radially extending spline section;
- coupling the first yoke to a second yoke of a first spline coupling to form a first U-joint;
- inserting the spline section of the second fitting into a channel of a sliding spline shaft such that the second fitting is slidably received within the channel, the sliding spline shaft including a grease port to enable grease to be injected into the channel, the sliding spline shaft having a third yoke;
- coupling the third yoke to a fourth yoke of a second spline coupling to form a second U-joint, the second spline coupling having an annular wall with splines around a surface of the annular wall;
- coupling the first spline coupling to a first high lift device on an aircraft, such that the first fitting is coupled, via the first spline coupling, to the first high lift device; and coupling the second spline coupling to a second high lift device on the aircraft.

15. The method of claim 14, further including inserting a retaining bolt into the sliding spline shaft that extends into the channel.

16. The method of claim 14, further including coupling a grease retainer to an end of the sliding spline shaft to cover an opening of the channel, the grease retainer including a first part and a second part that interlock to form the grease retainer, the first part and the second part being a same type of part.

17. The method of claim 14, further including injecting grease into the channel through the grease port on the sliding spline shaft.

18. The method of claim 14, wherein coupling the first spline coupling to the first high lift device includes sliding the first spline coupling onto a first spline gear on a first drive shaft of the first high lift device and fixedly coupling the first spline coupling to the first spline gear via a first threaded fastener, and wherein coupling the second spline coupling to the second high lift device includes sliding the second spline coupling onto a second spline gear on a second drive shaft of the second high lift device and fixedly coupling the second spline coupling to the second spline gear via a second threaded fastener.

19. The method of claim 14, wherein coupling the first fitting to the first end of the torque tube includes electromagnetically forming the first end of the torque tube onto the first fitting, and wherein coupling the second fitting to the second end of the torque tube includes electromagnetically forming the second end of the torque tube onto the second fitting.

* * * * *